(12) United States Patent
He et al.

(10) Patent No.: US 7,549,075 B2
(45) Date of Patent: Jun. 16, 2009

(54) SYSTEM AND METHOD FOR ADJUSTING EXECUTION FREQUENCY OF A CENTRAL PROCESSING UNIT

(75) Inventors: Xi-Huai He, Guangdong (CN); Hung-Ju Chen, Guangdong (CN)

(73) Assignees: Hong Fu Jin Precision Industry (Shen Zhen) Co., Ltd., Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 457 days.

(21) Appl. No.: 11/308,602

(22) Filed: Apr. 11, 2006

(65) Prior Publication Data

US 2006/0230301 A1 Oct. 12, 2006

(30) Foreign Application Priority Data

Apr. 12, 2005 (CN) .................. 2005 1 0034148

(51) Int. Cl.
  G06F 1/12 (2006.01)
  G06F 1/26 (2006.01)
  G06F 1/32 (2006.01)
(52) U.S. Cl. .................. 713/600; 713/300; 713/320; 713/322
(58) Field of Classification Search ............. 713/300, 713/320, 322, 600
See application file for complete search history.

(56) References Cited

U.S. PATENT DOCUMENTS

| | | | | |
|---|---|---|---|---|
| 6,907,535 B2 * | 6/2005 | Fang | .......................... | 713/322 |
| 7,062,394 B2 * | 6/2006 | Sun | .......................... | 713/322 |
| 7,131,016 B2 * | 10/2006 | Oh et al. | .......................... | 713/322 |
| 7,137,019 B2 * | 11/2006 | Hellerstein et al. | .......................... | 713/323 |
| 7,296,169 B2 * | 11/2007 | Cheng et al. | .......................... | 713/322 |
| 2002/0171603 A1 * | 11/2002 | Chen et al. | .......................... | 345/1.1 |
| 2004/0073826 A1 | 4/2004 | Yamashita | | |
| 2004/0205371 A1 | 10/2004 | Huang | | |
| 2005/0060596 A1 * | 3/2005 | Chang | .......................... | 713/600 |

FOREIGN PATENT DOCUMENTS

| CN | 1459692 A | 12/2003 |
|---|---|---|
| TW | 1220941 | 9/2004 |

* cited by examiner

Primary Examiner—Mark Connolly
(74) Attorney, Agent, or Firm—Winston Hsu

(57) ABSTRACT

A method for adjusting execution frequency of a central processing unit (CPU) in an electronic apparatus is provided. The method includes the steps of: (a) obtaining a state of a CPU workload in real time; (b) checking a property frequency and an execution frequency of the CPU; (c) determining whether the state of the CPU workload is in a higher state or a normal state; (d) determining whether the execution frequency of the CPU needs to be changed according to the state of the CPU workload; (e) calculating a frequency value according to the property frequency and the execution frequency, if the execution frequency of the CPU needs to be changed; (f) generating a suitable frequency according to the frequency value; and (g) adjusting the execution frequency of the CPU according to the suitable frequency. A related system is also disclosed.

14 Claims, 2 Drawing Sheets

SYSTEM AND METHOD FOR ADJUSTING EXECUTION FREQUENCY OF A CENTRAL PROCESSING UNIT

FIELD OF THE INVENTION

The present invention generally relates to the field of managing the execution efficiency of an electronic apparatus, and more particularly to a system and method for adjusting execution frequency of a central processing unit (CPU) in the electronic apparatus.

DESCRIPTION OF RELATED ART

The market demand for faster, smaller, lighter, and more powerful electronic devices has pushed electronic manufactures to constantly introduce an upgraded version of their existing products. Electronic apparatuses with central processing units (CPUs), such as personal computers, notebooks, personal digital assistants (PDAs) and information appliance (IA) are quickly developed. Each of these electronic apparatuses has an operation system (OS) playing both roles as an interface between users and electronic apparatuses, and as a manager of the software and hardware of the electronic apparatus.

When the electronic apparatus performs the OS after finishing the starting procedure, the CPU workload of the electronic apparatus will be different because a program or an instruction executed by the CPU is different at any given time. For example, when a personal computer is executing a complicated gaming program, the CPU workload is four or five times greater than that of executing a general document. Yet, the CPU would still use a unified and fixed front side bus (FSB) frequency to execute various programs and instructions, i.e. the CPU uses the same executing frequency to load instructions from different software even though the software has different degrees of complication. Hence, if the CPU executes simple programs, the fixed execution frequency of the CPU will cause inefficient use of resource consumption, increase power consumption, and reduce the life expectancy of the electronic apparatus.

The Intel developed Speed-Step Technology that is mainly used in a portable personal computer detects whether the power supply is provided by a mains power or a battery. The CPU of the portable personal computer will then switch to a high executing frequency if the mains power supply is detected, otherwise the CPU will switch to a lower executing frequency for saving energy resource. However, the CPU would still use the same execution frequency when computing instructions set of different complexity. Therefore, the purpose of the present invention is to develop a system and a method to deal with the above situations encountered in the prior art.

What is needed, therefore, is a system and method for adjusting execution frequency of a CPU in an electronic apparatus, which can dynamically adjust the execution frequency of the CPU according to the CPU workload at any time, so as to reduce the resource consumption and the power consumption, and increase the life expectancy of the electronic apparatus.

SUMMARY OF INVENTION

A system for adjusting execution frequency of a central processing unit in an electronic apparatus in accordance with a preferred embodiment at least includes a central processing unit (CPU), an operation system (OS), a basic input output system (BIOS), and a frequency generator. The OS at least includes an OS-directed configuration and power management (OSPM) module. The BIOS at least includes an advanced configuration and power interface (ACPI), and a frequency processing module.

The OSPM module is used for obtaining a state of a CPU workload by detecting the usage ratio of the CPU in real time, and transmitting the state of the CPU workload value to the BIOS via the ACPI. The frequency processing module is used for determining whether the execution frequency of the CPU whether needs to be changed according to the state of the CPU workload, calculating a frequency value according to the execution frequency and a property frequency of the CPU, and adjusting the execution frequency of the CPU according to the frequency value.

Furthermore, the frequency processing module includes a frequency checking sub-module, a frequency calculating sub-module, and a frequency adjusting sub-module. The frequency checking sub-module is used for checking the execution frequency and the property frequency of the CPU, and determining whether the execution frequency needs to be changed according to the state of the CPU workload and the execution frequency of the CPU. The frequency calculating sub-module is used for calculating the frequency value according to the execution frequency and the property frequency of the CPU, and writing the frequency value to the frequency generator for generating a suitable frequency. The frequency adjusting sub-module is used for adjusting the execution frequency of the CPU to the suitable frequency generated by the frequency generator.

Another preferred embodiment provides a method for adjusting execution frequency of a central processing unit (CPU) in an electronic apparatus by utilizing the above system. The method includes the steps of: (a) obtaining a state of a CPU workload from the CPU; (b) checking a property frequency and an execution frequency of the CPU; (c) determining whether the state of the CPU workload is in a higher state or a normal state; (d) determining whether the executing frequency of the CPU needs to be changed according to the state of the CPU workload; (e) calculating a frequency value according to the property frequency and the execution frequency, if the executing frequency of the CPU needs to be changed; (f) generating a suitable frequency according to the frequency value; and (g) adjusting the execution frequency of the CPU to the suitable frequency.

In summary, the system and method for adjusting execution frequency of the CPU can dynamically adjust the execution frequency of the CPU to a suitable frequency in the electronic apparatus according to the CPU workload at any given time.

Other advantages and novel features of the embodiments will be drawn from the following detailed description with reference to the attached drawings, in which:

DETAILED DESCRIPTION

Figure 1:
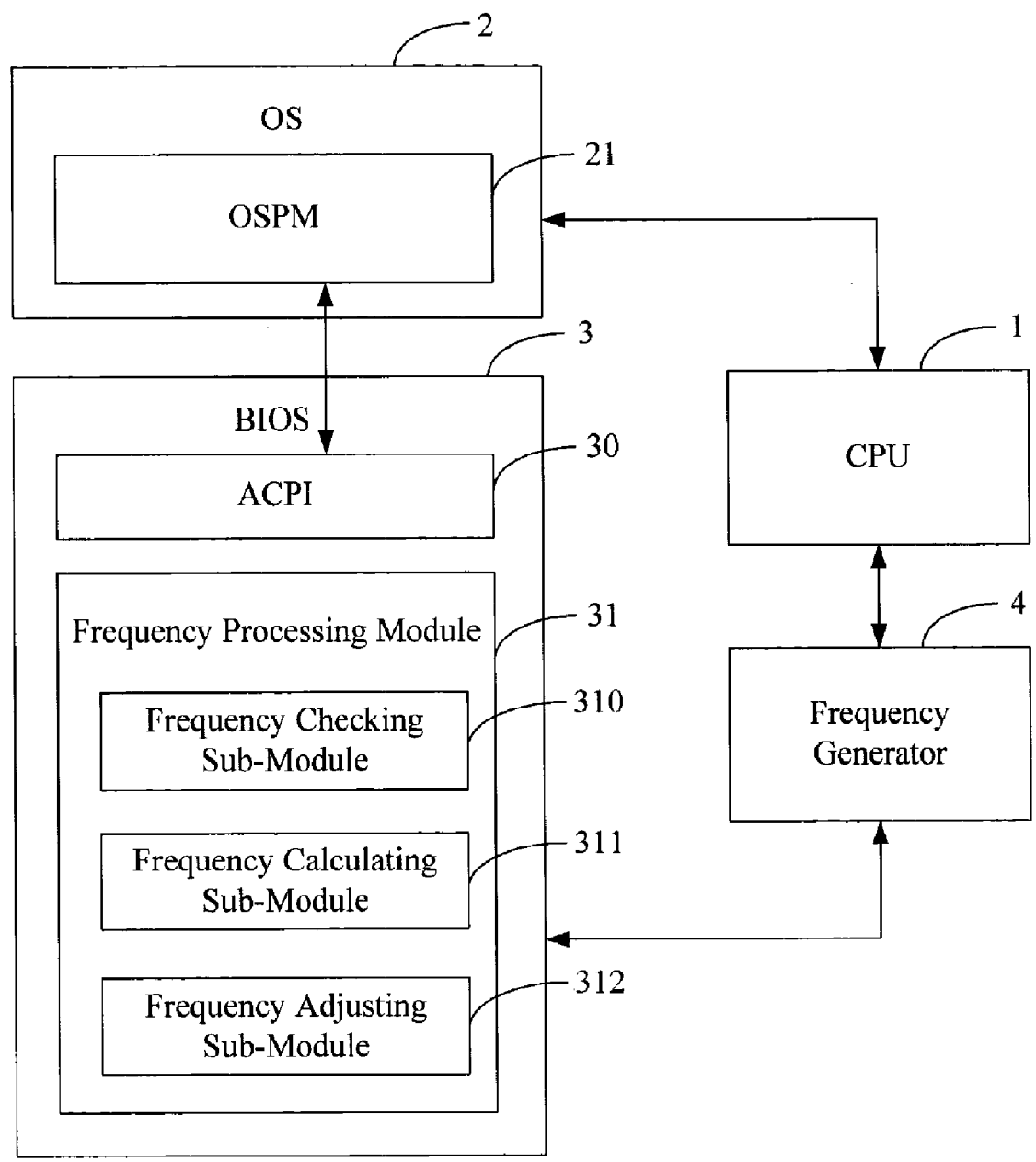
FIG. 1 is a schematic diagram of a system for adjusting execution frequency of a central processing unit (CPU) in accordance with a preferred embodiment.

FIG. 1 is a schematic diagram of a system for adjusting execution frequency of a central processing unit (hereinafter "the system") in accordance with a preferred embodiment. The system at least includes a central processing unit (CPU) 1, an operation system (OS) 2, a basic input output system (BIOS) 3, and a frequency generator 4.

The CPU 1 may use different frequencies to execute various programs (such as the OS 2, or other applications) and instructions installed in the electronic apparatus. The OS 2, such as Windows, Unix and Linux, plays both roles as an interface between users and an electronic apparatus, and also as a manager of both software and hardware of the electronic apparatus. The electronic apparatus may be a personal computer, a notebook, a personal digital assistant (PDA), or an information appliance (IA). The OS 2 at least includes an OS-directed configuration and power management (OSPM) module 21. The BIOS 3 at least includes an advanced configuration and power interface (ACPI) 30 and a frequency processing module 31.

In the preferred embodiment, the OSPM module 21 is used for obtaining the state of the CPU 1 workload by detecting the usage ratio of the CPU 1 in real time, and transmitting the state of the CPU workload to the BIOS 3 via the ACPI 30. The frequency processing module 31 is used for checking the state of the CPU 1 workload obtained by the BIOS 3, determining whether the execution frequency of the CPU 1 needs to be changed according to the CPU 1 workload, calculating a frequency value according to the execution frequency and a property frequency of the CPU 1, and adjusting the execution frequency of the CPU 1 to a suitable frequency. Wherein the property frequency is a unified and fixed front side bus (FSB) frequency of the CPU 1 type. For example, the property frequency of Intel Celeron M350 is 1.30 GHz, and the property frequency of Intel Celeron M360 is 1.40 GHz.

The frequency processing module 31 may be embedded in the BIOS 3 or any other suitable application of the electronic apparatus, and includes a frequency checking sub-module 310, a frequency calculating sub-module 311 and a frequency adjusting sub-module 312. The frequency checking sub-module 310 is used for checking the property frequency and the execution frequency of the CPU 1, and determining whether the execution frequency needs to be changed in accordance with the current workload of the CPU 1 and the execution frequency of the CPU 1. The frequency calculating sub-module 311 is used for calculating a frequency value according to the property frequency and the execution frequency of the CPU 1, and writing the frequency value to the frequency generator 4 for generating a suitable frequency. The frequency adjusting sub-module 312 is used for adjusting the executing frequency of the CPU 1 to the suitable frequency, in order to ensure that the CPU 1 continues to work in a normal state.

The frequency generator 4 is used for generating the suitable frequency of the CPU 1 according to the frequency value calculated by the frequency processing module 31.

Figure 2:
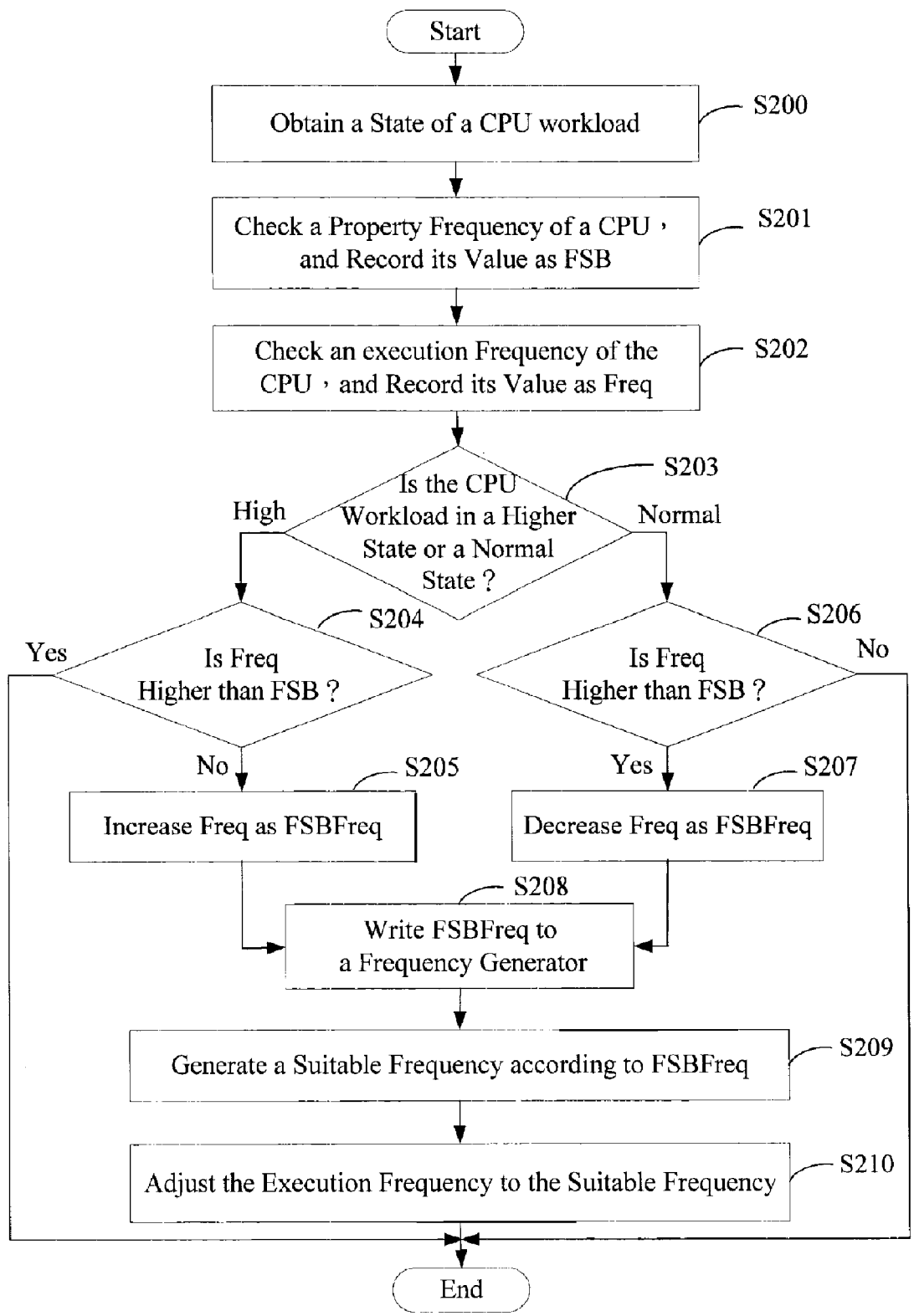
FIG. 2 is a flowchart of a preferred method for adjusting the execution frequency of a CPU by implementing the system of FIG. 1.

FIG. 2 is a flowchart of a preferred method for adjusting the execution frequency of the CPU 1 by implementing the system. In step S200, the OS 2 obtains a state of a CPU 1 workload from the CPU 1 in real time, and transmits the state of the CPU 1 workload to the BIOS 3 via the OSPM module 21 by means of utilizing the ACPI 30. In step S201, the frequency checking sub-module 310 checks a property frequency of the CPU 1 (symbolically depicted as FSB). In step S202, the frequency checking sub-module 310 checks an execution frequency of the CPU 1 (symbolically depicted as Freq). In step S203, the frequency checking sub-module 310 determines whether the CPU 1 workload is in a higher state or a normal state according to usage ratio of the CPU 1. Generally, the CPU 1 workload is in a higher state when the usage ratio of the CPU 1 is more than 80%; otherwise, the CPU 1 workload is in a normal state.

If the CPU 1 workload is in a higher state, in step S204, the frequency checking sub-module 210 determines whether the execution frequency is higher than the property frequency. If the execution frequency is not higher than the property frequency, in step S205, the frequency calculating sub-module 311 increases the execution frequency as a suitable frequency (symbolically depicted as FSBFreq), and calculates the value of the suitable frequency according to a formula: FSBFreq=FSB*(1+m), where m is a frequency multiplier. Otherwise, if the execution frequency is higher than the property frequency (that is, the execution frequency of the CPU 1 does not need to be changed), the procedure is finished.

If the CPU 1 workload is in a normal state, in step S206, the frequency checking sub-module 310 determines whether the execution frequency is higher than the property frequency. If the execution frequency is higher than the property frequency, in step S207, the frequency calculating sub-module 311 decreases the current frequency as a suitable frequency, and sets the value of the suitable frequency as the value of the property frequency (that is FSBFreq=FSB). Otherwise, if the execution frequency is not higher than the property frequency (that is, the execution frequency of the CPU 1 does not need to be changed), the procedure is finished.

In step S208, the frequency calculating sub-module 311 writes the frequency value to the frequency generator 4 for generating a suitable frequency. In step S209, the frequency generator 4 generates the suitable frequency according to the frequency value. In step S210, the frequency adjusting sub-module 312 adjusts the execution frequency of the CPU 1 to the suitable frequency, in order to ensure that the CPU 1 continues to work in a normal state.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for adjusting execution frequency of a central processing unit (CPU) in an electronic apparatus, the system comprising:

an operating system (OS) at least comprising an OS-directed configuration and power management (OSPM) module;

a basic input output system (BIOS) at least comprising an advanced configuration and power interface (ACPI), and a frequency processing module; wherein:

the OSPM module is used for obtaining a state of a CPU workload by detecting the usage ratio of the CPU in real time, and transmitting the state of the CPU workload to the BIOS via the ACPI; and the frequency processing module is used for determining whether an execution frequency of the CPU needs to be changed according to the state of the CPU workload, determining whether the execution frequency is higher than a property frequency of the CPU if the CPU workload is in a normal state, decreasing the execution frequency as a suitable frequency if the execution frequency is higher than the property frequency, and adjusting the execution frequency of the CPU according to the suitable frequency.

2. The system according to claim 1, wherein the electronic apparatus is selected from the group consisting of a personal computer, a notebook, a personal digital assistant (PDA), and an information appliance (IA).

3. The system according to claim 1, further comprising a frequency generator for generating the suitable frequency of the CPU according to the property frequency.

4. The system according to claim 1, wherein the frequency processing module comprises a frequency checking sub-module for checking the execution frequency and the property frequency of the CPU, and determining whether the execution frequency needs to be changed according to the state of the CPU workload.

5. The system according to claim 1, wherein the frequency processing module comprises a frequency calculating sub-module for determining whether the execution frequency of the CPU is higher than the property frequency if the CPU workload is in a higher state, and increasing the execution frequency as the suitable frequency if the execution frequency is less than the property frequency.

6. The system according to claim 3, wherein the frequency processing module comprises a frequency adjusting sub-module for adjusting the execution frequency of the CPU to the suitable frequency generated by the frequency generator.

7. A method for adjusting execution frequency of a central processing unit (CPU) in an electronic apparatus, the method comprising the steps of:
obtaining a state of a CPU workload from the CPU;
checking an execution frequency and a property frequency of the CPU;
determining whether the state of CPU workload is in a higher state or a normal state;
determining whether the execution frequency of the CPU needs to be changed according to the state of the CPU workload;
determining the execution frequency is higher than the property frequency, if the CPU workload is in a normal state;
decreasing the execution frequency as a suitable frequency, if the execution frequency is higher than the property frequency; and
adjusting the execution frequency of the CPU to the suitable frequency.

8. The method according to claim 7, wherein the step of determining the state of the CPU workload is by checking a usage ratio of the CPU.

9. The method according to claim 7, wherein the step of determining whether the execution frequency of the CPU needs to be changed according to the state of the CPU workload, further comprises the steps of:
determining the execution frequency is higher than the property frequency, if the CPU workload is in a higher state; and
increasing the execution frequency as the suitable frequency, if the execution frequency is less than the property frequency.

10. The method according to claim 9, wherein the suitable frequency equals to the property frequency multiplied by (1+m), in which m is a frequency multiplier.

11. The method according to claim 7, wherein the suitable frequency equals to the property frequency.

12. A method for adjusting execution frequency of a central processing unit (CPU) in an electronic apparatus, the method comprising the steps of:
measuring a state of a CPU workload in real time;
determining whether an execution frequency of the CPU needs to be changed according to the state of the CPU workload;
determining the execution frequency is higher than the property frequency, if the CPU workload is in a normal state;
decreasing the execution frequency as a suitable frequency, if the execution frequency is higher than a property frequency; and
adjusting the execution frequency of the CPU to the suitable frequency.

13. The method according to claim 12, wherein the state of the CPU workload is determined by checking a usage ratio of the CPU.

14. The method according to claim 12, further comprising the steps of:
determining the execution frequency is higher than the property frequency, if the CPU workload is in a higher state; and
increasing the execution frequency as the suitable frequency, if the execution frequency is less than the property frequency.

* * * * *